US011926034B1

(12) United States Patent
Yu

(10) Patent No.: US 11,926,034 B1
(45) Date of Patent: Mar. 12, 2024

(54) TOOL HANGER

(71) Applicant: Jianyong Yu, Linhai (CN)

(72) Inventor: Jianyong Yu, Linhai (CN)

( * ) Notice: Subject to any disclaimer, the term of this patent is extended or adjusted under 35 U.S.C. 154(b) by 0 days.

(21) Appl. No.: 17/968,225

(22) Filed: Oct. 18, 2022

(51) Int. Cl.
*B25H 3/04* (2006.01)
*B25H 3/00* (2006.01)

(52) U.S. Cl.
CPC .................................... *B25H 3/04* (2013.01)

(58) Field of Classification Search
CPC ... B25H 3/04; B25H 3/00; B25H 3/02; B25H 3/021; A47F 5/08; A47F 5/0006
See application file for complete search history.

(56) References Cited

U.S. PATENT DOCUMENTS 6,305,557 B1 * 10/2001 Brooks .................... B25H 3/04 211/94.01
6,702,128 B2 * 3/2004 Winig .................. A47B 96/067 211/183
7,424,958 B1 * 9/2008 Eley ...................... A47F 5/0815 211/70.6
9,120,219 B1 * 9/2015 Liao ....................... B25H 3/021
2011/0266283 A1 * 11/2011 Ernst .................... A47B 96/067 220/476
2014/0166516 A1 * 6/2014 Martinez ................. A45F 5/021 206/372
2020/0069082 A1 * 3/2020 Altizer ..................... B25H 3/04
2022/0040842 A1 * 2/2022 Groves .................... B25H 1/16
2022/0117393 A1 * 4/2022 Jenkins .................. B25H 3/021
2022/0126437 A1 * 4/2022 Barton ...................... B25H 3/02
2022/0324093 A1 * 10/2022 Jenkins .................. B25H 3/006
2023/0013694 A1 * 1/2023 Evatt ...................... B65D 43/22
2023/0036215 A1 * 2/2023 Williams ................. B25H 3/04

FOREIGN PATENT DOCUMENTS

EP 2599410 A1 * 6/2013 .......... A47F 5/0006
TW M469813 U 1/2014
TW M486388 U 9/2014
TW M507504 U 8/2015

* cited by examiner

*Primary Examiner* — Kimberley S Wright
(74) *Attorney, Agent, or Firm* — Muncy, Geissler, Olds & Lowe, P.C.

(57) ABSTRACT

A tool hanger is provided, including: a base, including first, second, third and fourth end portions, the first and second end portions being arranged in a first direction, the third and second end portions being arranged in a second direction; at least one first connection unit, including elastic clip portions and a clipped portion, one of the first and second end portions including the elastic clip portions and the other including the clipped portion, the elastic clip portions clipping a clipped portion of another base; and at least one second connection unit, including a projection and a concave portion, one of the projection and the concave portion being disposed on the third end portion and the other being disposed on the fourth end portion, the projection being configured to be engaged within a concave portion of the another base.

9 Claims, 10 Drawing Sheets

TOOL HANGER

BACKGROUND OF THE INVENTION

Field of the Invention

The present invention relates to a tool hanger.

Description of the Prior Art

Hanging devices are often to be mounted on buildings to hang objects to make full use of the space, thereby achieving the purpose of effectively utilizing space. The hanging devices are like those disclosed in TW M507504, M486388 and M469813.

However, the hanging devices disclosed in the above-mentioned patents are all designed for a specific object, and they each have only one operation mode in use. Therefore, when a plurality of hanging devices need to be used at the same time, the spaces for hanging objects by the hanging devices interfere with each other, which affects the size of object to be hanged.

The present invention is, therefore, arisen to obviate or at least mitigate the above-mentioned disadvantages.

SUMMARY OF THE INVENTION

The main object of the present invention is to provide a tool hanger which can be assembled and connected in two different directions and which is modularized for wide applications.

To achieve the above and other objects, a tool hanger is provided, including: a base, including a first end portion, a second end portion, a third end portion and a fourth end portion, the first end portion and the second end portion being arranged in interval in a first direction, the third end portion and the second end portion being arranged in interval in a second direction, the second direction being transverse to the first direction; at least one first connection unit, including a plurality of elastic clip portions and a clipped portion, one of the first end portion and the second end portion including the plurality of elastic clip portions, the other of the first end portion and the second end portion including the clipped portion, the plurality of elastic clip portions clipping a clipped portion of another base; and at least one second connection unit, including a projection and a concave portion, one of the projection and the concave portion being disposed on the third end portion, the other of the projection and the concave portion being disposed on the fourth end portion, the projection being configured to be engaged within a concave portion of the another base.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
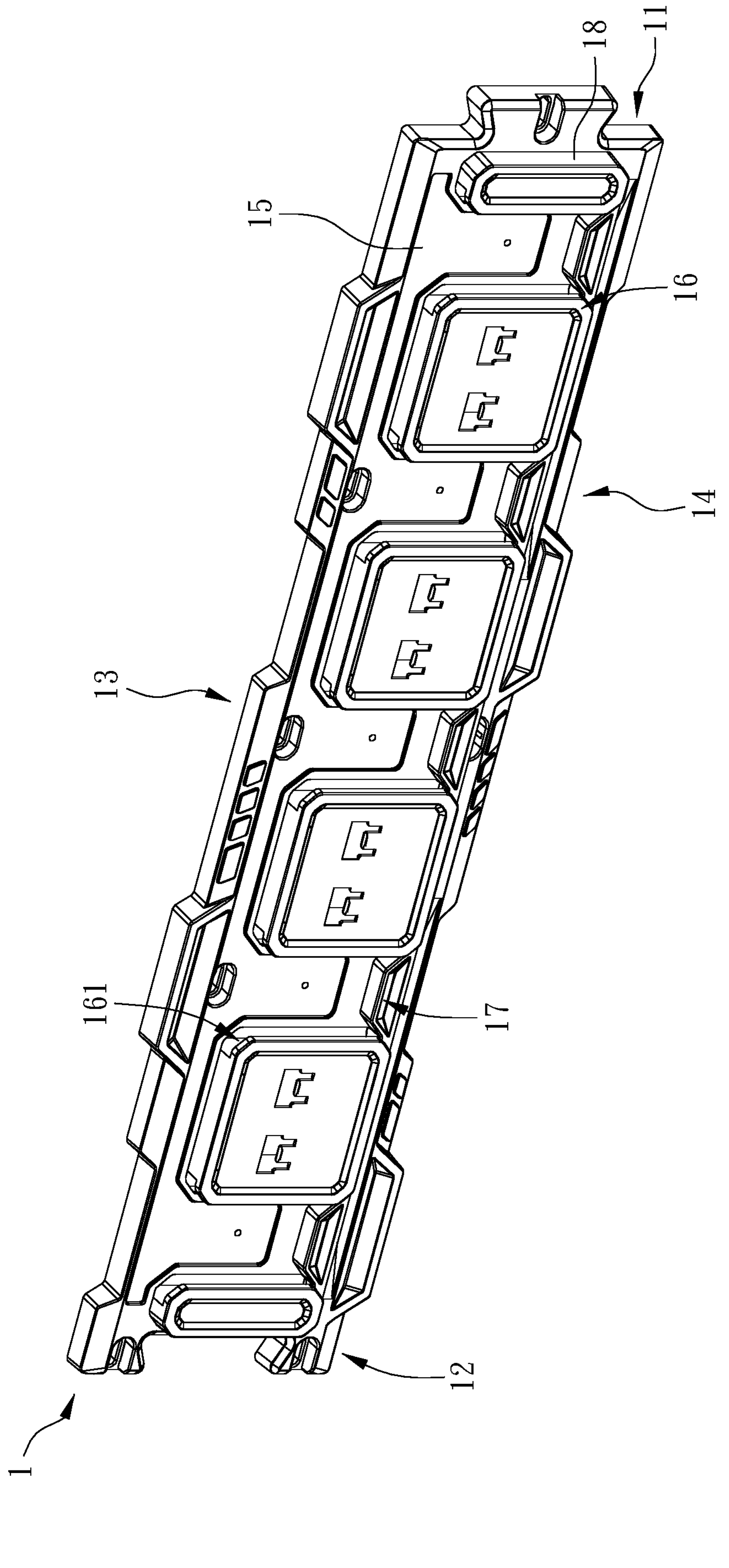
FIG. 1 is a stereogram of a preferable embodiment of the present invention.
Figure 2:
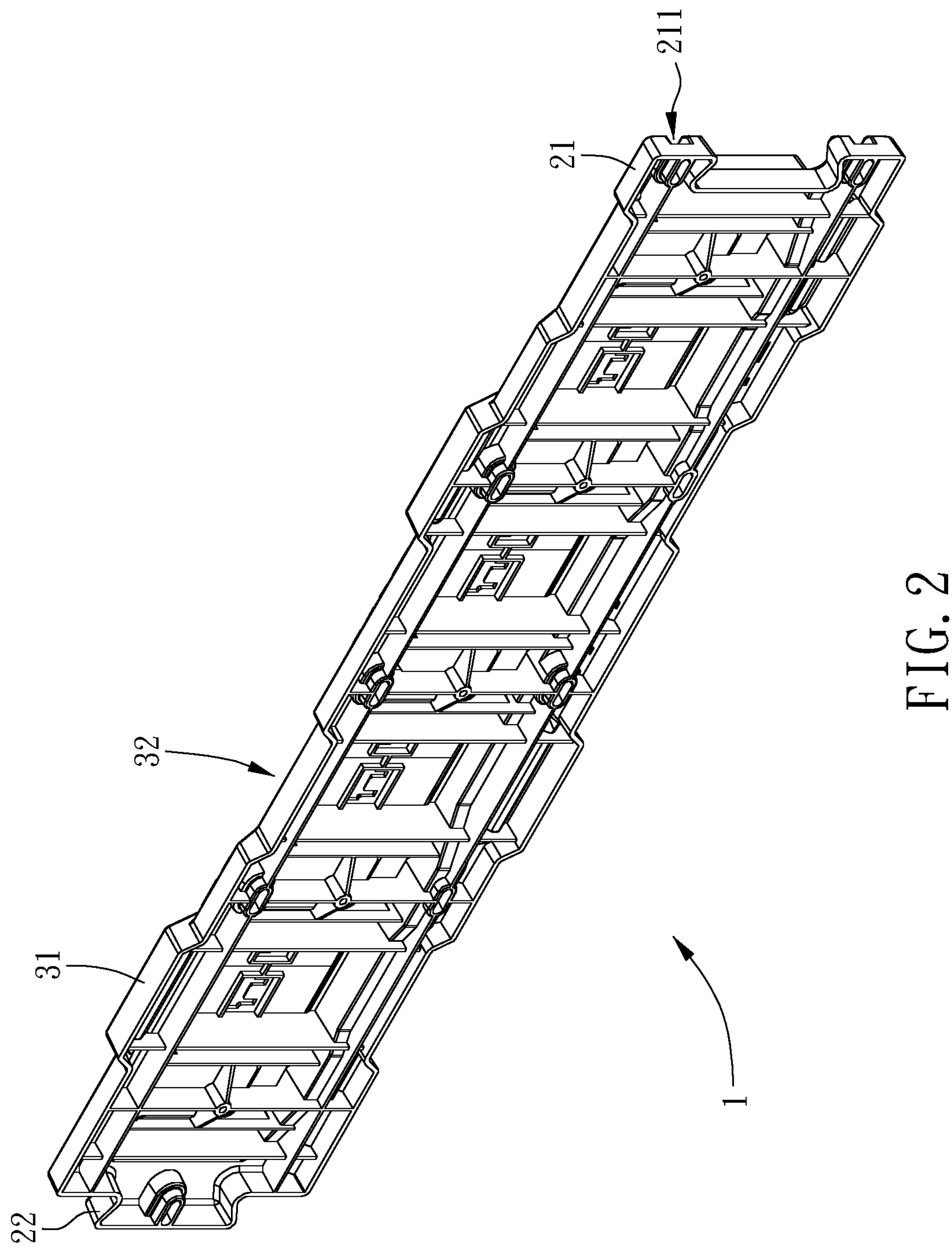
FIG. 2 is another stereogram of a preferable embodiment of the present invention.
Figure 3:
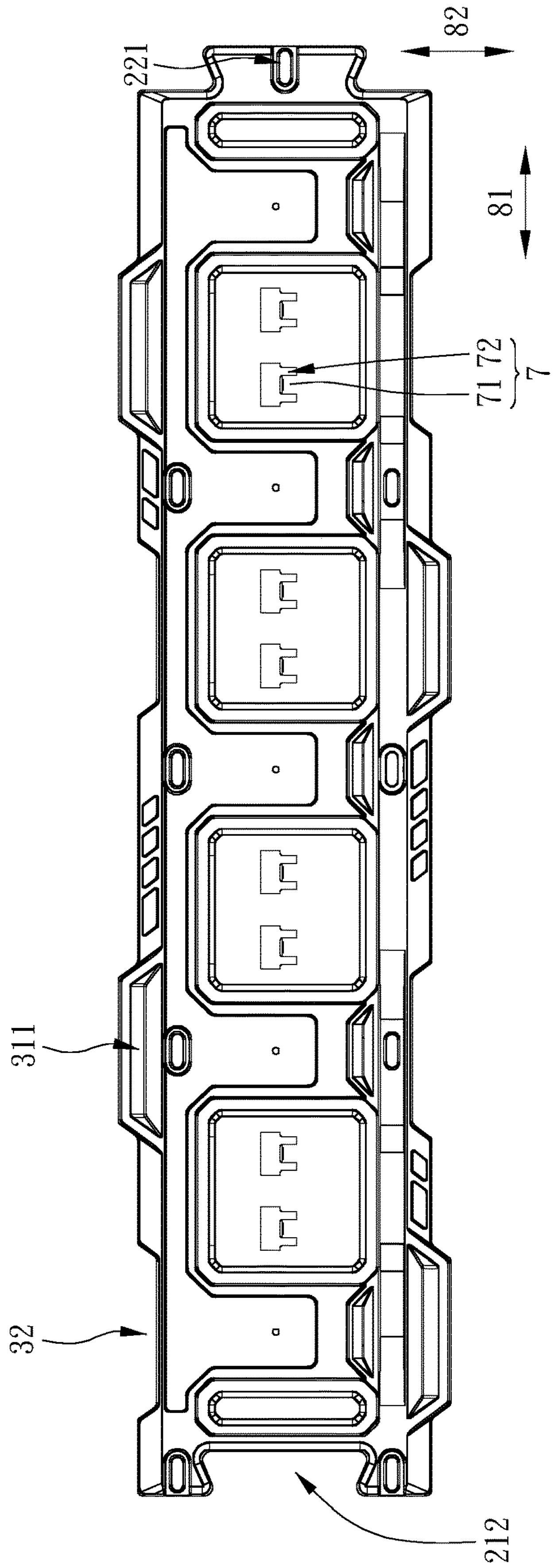
FIG. 3 is a front view of FIG. 1.
Figure 4:
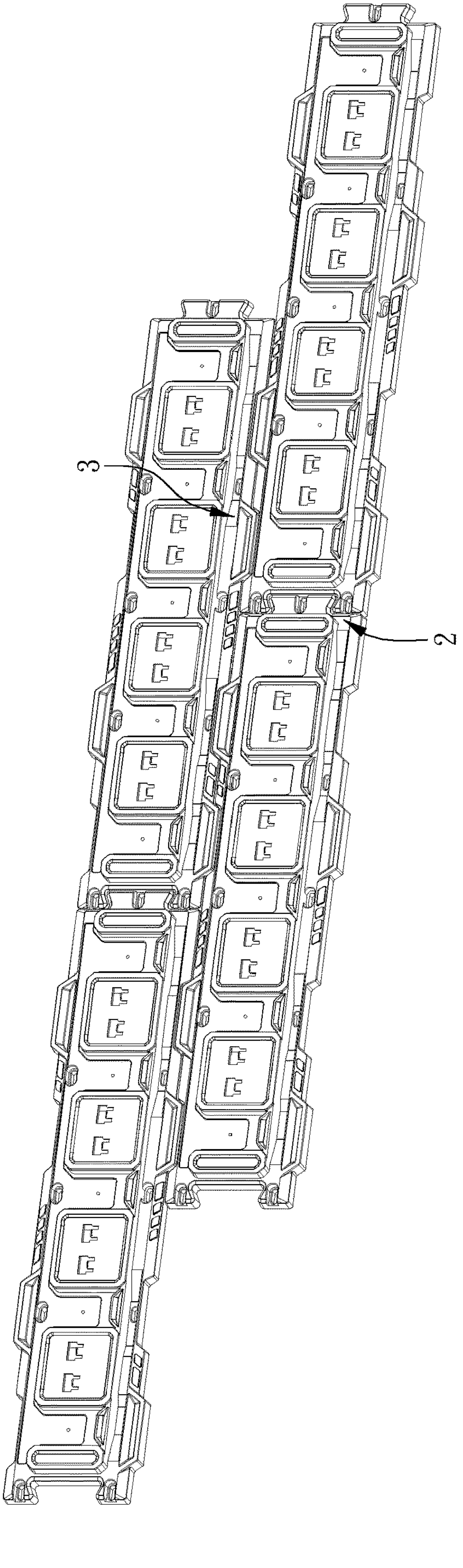
FIG. 4 is a drawing showing a plurality of tool hangers connected according to a preferable embodiment of the present invention.
Figure 5:
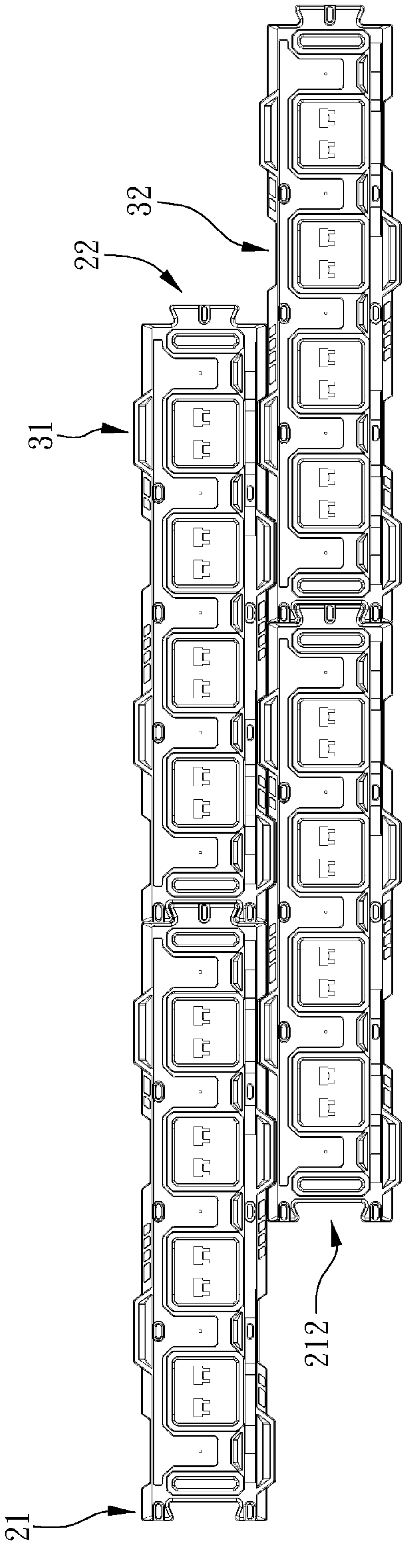
FIG. 5 is a front view of FIG. 4.
Figure 6:
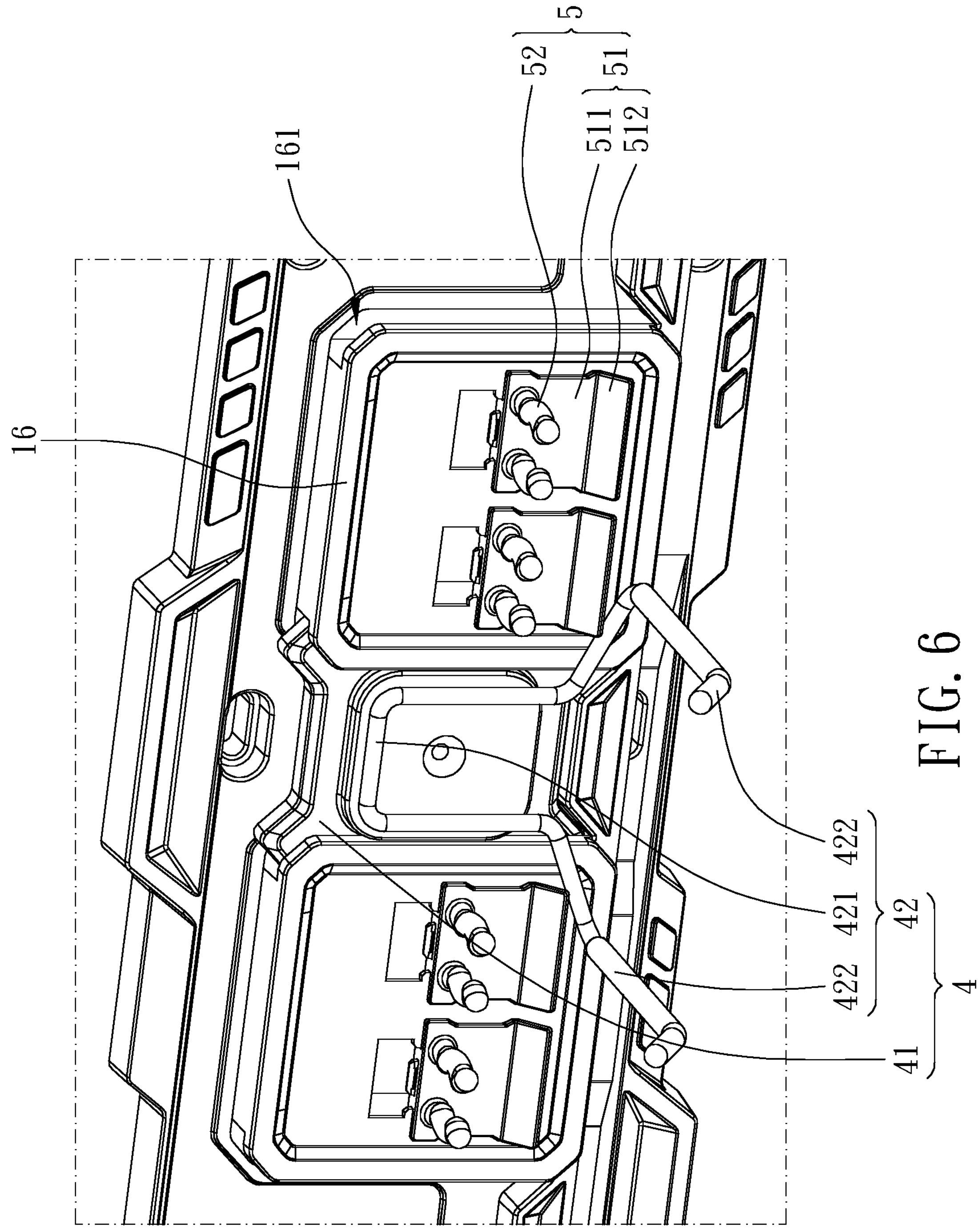
FIG. 6 is a drawing showing operations of a first hanging unit and a second hanging unit according to a preferable embodiment of the present invention.
Figure 7:
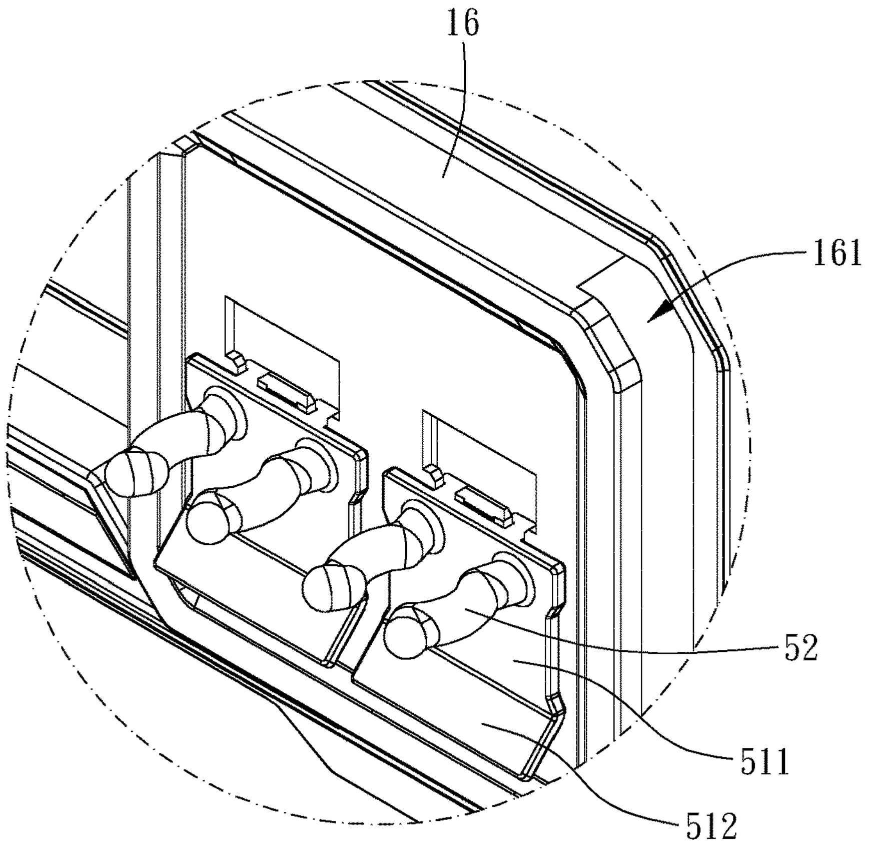
FIG. 7 is a stereogram showing a second hanging unit positioned to a seat body according to a preferable embodiment of the present invention.
Figure 8:
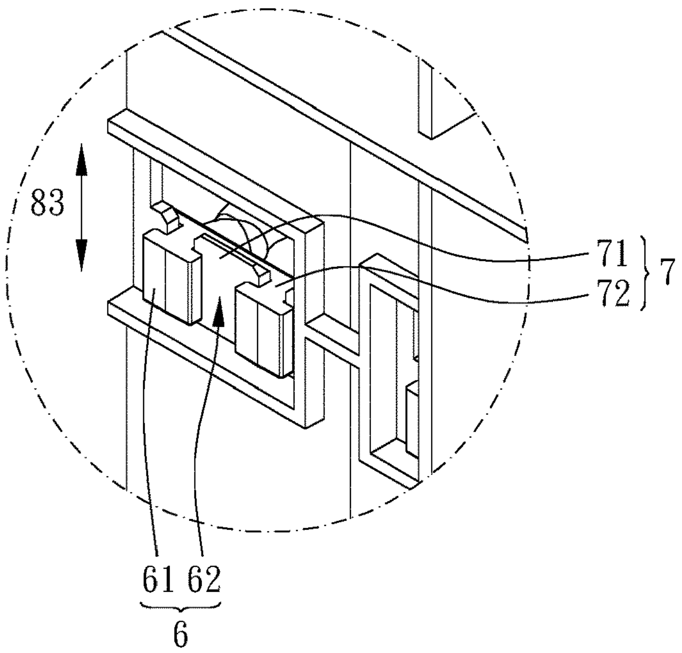
FIG. 8 is a stereogram showing a first positioning structure connected to a second positioning structure according to a preferable embodiment of the present invention.
Figure 9:
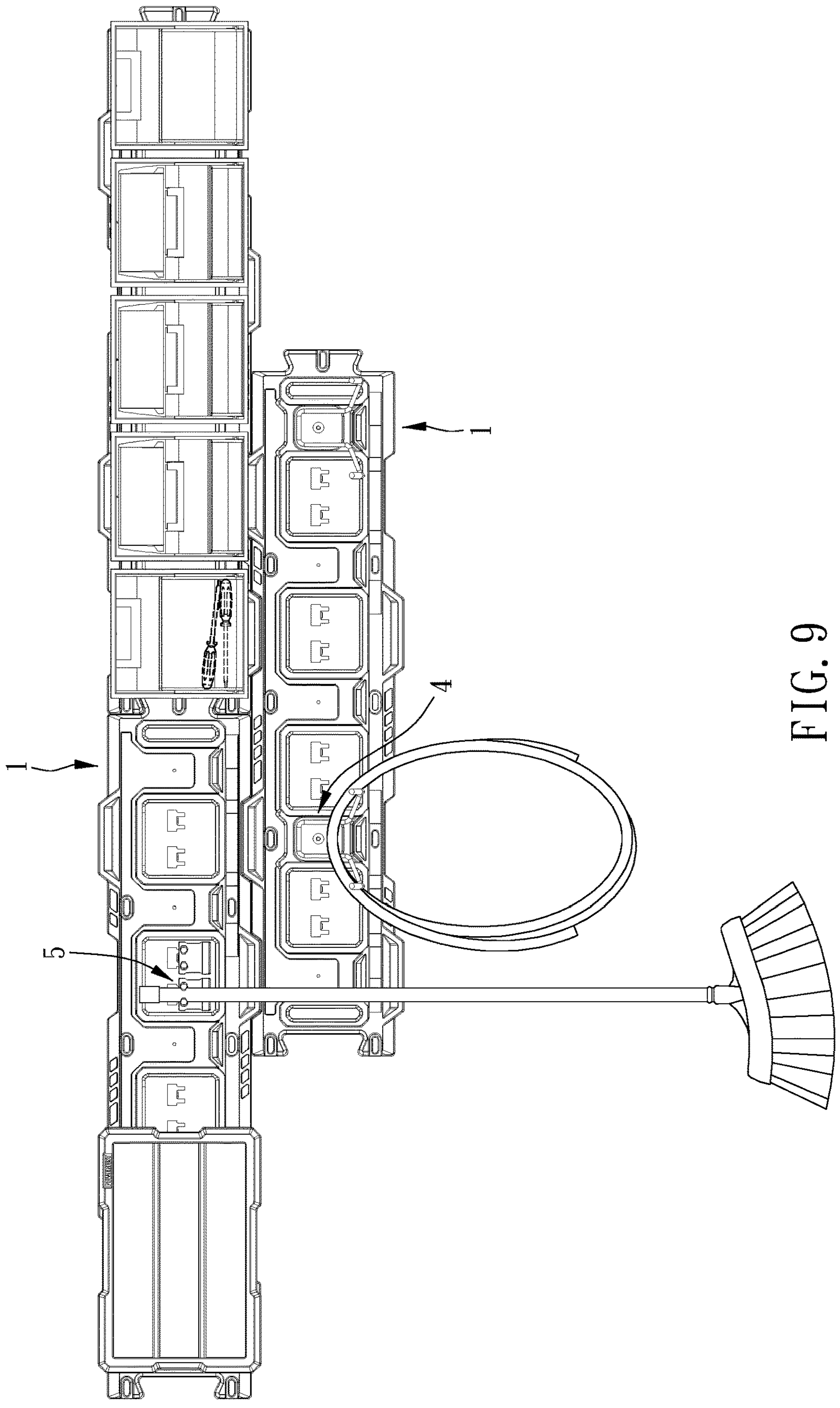
FIG. 9 is a drawing showing operation of a preferable embodiment of the present invention.
Figure 10:
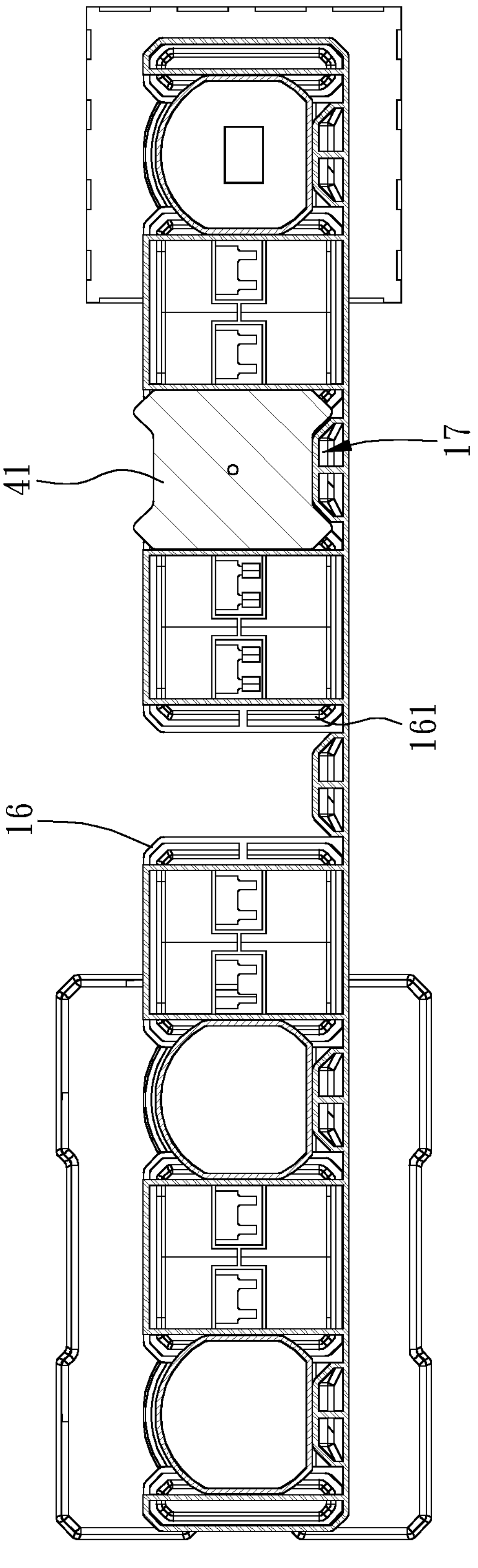
FIG. 10 is a cross-sectional view of FIG. 9.
Figure 11:
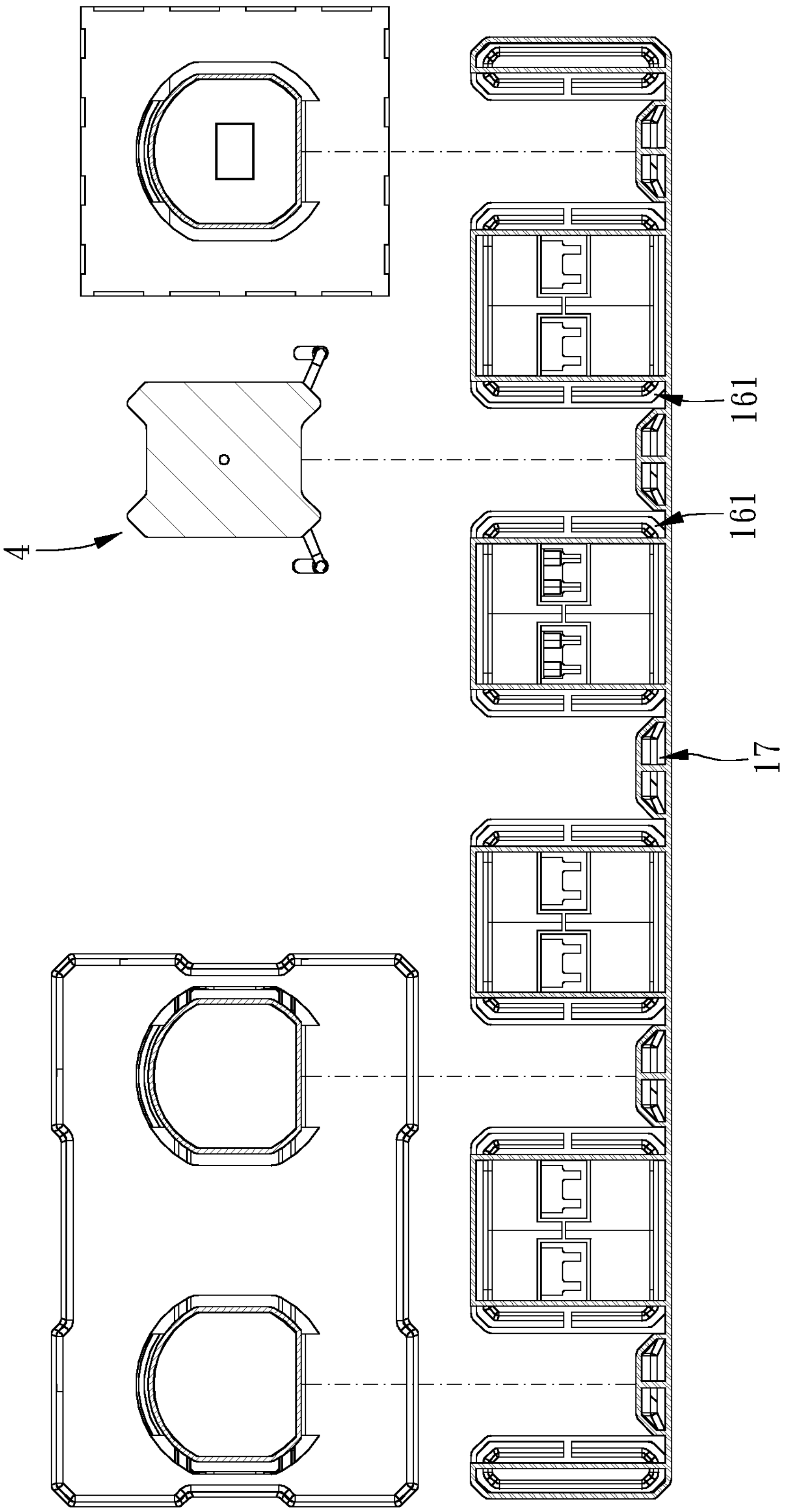
FIG. 11 is a breakdown drawing of FIG. 10.

Please refer to FIGS. 1 to 11 for a preferable embodiment of the present invention. A tool hanger of the present invention includes a base 1, at least one first connection unit 2 and at least one second connection unit 3.

The base 1 is configured to be fixedly mounted to a wall or the like. The base 1 includes a first end portion 11, a second end portion 12, a third end portion 13 and a fourth end portion 14. The first end portion 11 and the second end portion 12 are arranged in interval in a first direction 81, the third end portion 13 and the second end portion 12 are arranged in interval in a second direction 82, and the second direction 82 is transverse to the first direction 81.

The at least one first connection unit 2 includes a plurality of elastic clip portions 21 and a clipped portion 22, one of the first end portion 11 and the second end portion 12 includes the plurality of elastic clip portions 21, the other of the first end portion 11 and the second end portion 12 includes the clipped portion 22, and the plurality of elastic clip portions 21 clip a clipped portion of another base. As such, a plurality of the bases can be connected by the at least one first connection unit 2 in the first direction 81.

The at least one second connection unit 3 includes a projection 31 and a concave portion 32, one of the projection 31 and the concave portion 32 is disposed on the third end portion 13, the other of the projection 31 and the concave portion 32 is disposed on the fourth end portion 14, and the projection 31 is configured to be engaged within a concave portion of the another base. Similarly, a plurality of the bases can be connected by the at least one second connection unit 3 in the second direction 82.

In other words, the plurality of bases 1 can be assembled in the first direction 81 and/or the second direction 82, which increases areas for hanging tools. In this embodiment, the base 1 is formed by plastic injection molding, allowing mass production, and the plastic material makes the plurality of elastic clip portions 21 elastic, pliable and strong. Preferably, the projection 31 includes a receiving room 311; the receiving room 311 is provided for gripping; and the projection 31 and the concave portion 32 are trapezoidal, which provides large contact area and good support. The plurality of elastic clip portions 21 are separate and protrusive from the base 1 and define a dovetail slot 212, the clipped portion 22 is protrusive from the base 1 and is dovetailed, and the clipped portion 22 is configured to be received in dovetail slot of the another base, wherein dovetailed structures can enhance the combination and the structural strength.

Preferably, the base 1 further includes a plurality of reinforcing ribs 18, and the plurality of reinforcing ribs 18 are disposed adjacent to the first end portion 11 and the second end portion 12. The plurality of reinforcing ribs 18 can enhances the connection of the base 1 to the at least one first connection unit 2 and the at least one second connection unit 3.

Preferably, each of the plurality of elastic clip portions 21 includes a first recess 211, the first recess 211 configured to increase flexibility of each of the plurality of elastic clip portions 21, and the clipped portion 22 includes a second recess 221 configured to increase flexibility of the clipped portion 22.

The hanger further includes at least one first hanging unit 4, the at least one first hanging unit 4 includes an insertion portion 41 and a first hanging member 42 connected to each other, the base 1 further includes a substrate 15 and a plurality of seat bodies 16, each of the plurality of seat bodies 16 is a rectangular block, and the substrate 15 is an elongated plate. The substrate 15 includes the first end portion 11, the second end portion 12, the third end portion 13 and the fourth end portion 14, and the plurality of seat bodies 16 are protrusive beyond the substrate 15 and arranged in intervals. Respective sides of neighboring two of the plurality of seat bodies 16 facing each other each include a slot 161, and the insertion portion 41 is positionably inserted within the slot 161 of the neighboring two of the plurality of seat bodies 16 in an insertion direction 83. The at least one first hanging unit 4 can be easily and quickly connected to the base 1 by means of sliding insertion, and the load onto the at least one first hanging unit 4 can be evenly distributed to the neighboring two of the plurality of seat bodies 16, so it provides excellent load-bearing capacity and stability.

Preferably, the base 1 further includes at least one supporting block 17, the at least one supporting block 17 is disposed between the neighboring two of the plurality of seat bodies 16, and when the insertion portion 41 of the at least one first hanging unit 4 is inserted in the slot 161 of the neighboring two of the plurality of seat bodies 16, the at least one supporting block 17 is abutted against the insertion direction 83 of the at least one first hanging unit 4, wherein the at least one supporting block 17 can effectively increase the contact area and provides reliable support.

In this embodiment, the first hanging member 42 is made of metal and has good structural strength, the first hanging member 42 includes a main rod 421 and two supporting rods 422, the two supporting rods 422 are connected to opposing ends of the main rod 421 respectively, and the two supporting rods 422 extend away from each other and are located correspondingly above the neighboring two of the plurality of seat bodies 16 respectively, to provide large hanging space.

The tool hanger further includes at least one second hanging unit 5, the at least one second hanging unit 5 includes a main body 51, a first positioning structure 6 and a second hanging member 52. The first positioning structure 6 and the second hanging member 52 are disposed at opposing sides of the main body 51 respectively, each of the plurality of seat bodies 16 includes at least one second positioning structure 7, and the at least one second positioning structure 7 is configured to be connected with the first positioning structure 6 of the at least one second hanging unit 5.

Specifically, the neighboring two of the plurality of seat bodies 16 is provided for combination of the at least one first hanging unit 4 on which large objects can be hanged, while each of the plurality of seat bodies 16 is provided for combination of the at least one second hanging unit 5 on which small objects can be hanged, which can fully meet the various hanging needs.

Specifically, one of the first positioning structure 6 and the second positioning structure 7 includes two flanges 61 and an engaging slot 62, and the other of the first positioning structure 6 and the second positioning structure 7 includes a protrusion 71 and two engaging grooves 72. The two flanges 61 are arranged in interval and define the engaging slot 62, the two engaging grooves 72 are located at opposing sides of the protrusion 71, the protrusion 71 is inserted within the engaging slot 62 in an insertion direction 83, and the two flanges 61 are engaged within the two engaging grooves 72 in the insertion direction 83 so that the two flanges 61 are lockable by the protrusion 71 in a direction transverse to the insertion direction 83.

In this embodiment, the at least one second positioning structure includes two second positioning structures 7, thus enhancing the structural strength of the seat body 16; the main body 51 includes a first portion 511 and a second portion 512, the first positioning structure 6 and the second hanging member 52 are disposed on the first portion 511, an end of the second portion 512 is connected to the first portion 511, and another end of the second portion 512 extends away from the first portion 511 and away from the substrate 15, thus being easy to operate and use.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A tool hanger, including:

a base, including a first end portion, a second end portion, a third end portion and a fourth end portion, the first end portion and the second end portion being arranged in interval in a first direction, the third end portion and the second end portion being arranged in interval in a second direction, the second direction being transverse to the first direction;

at least one first connection unit, including a plurality of elastic clip portions and a clipped portion, one of the first end portion and the second end portion including the plurality of elastic clip portions, the other of the first end portion and the second end portion including the clipped portion, the plurality of elastic clip portions clipping a clipped portion of another base; and at least one second connection unit, including a projection and a concave portion, one of the projection and the concave portion being disposed on the third end portion, the other of the projection and the concave portion being disposed on the fourth end portion, the projection being configured to be engaged within a concave portion of the another base;

wherein the tool hanger further includes at least one second hanging unit, the at least one second hanging unit includes a main body, a first positioning structure and a second hanging member, the first positioning structure and the second hanging member are disposed at opposing sides of the main body respectively, the base further includes a substrate and a plurality of seat bodies, the substrate includes the first end portion, the second end portion, the third end portion and the fourth end portion, the plurality of seat bodies are protrusive beyond the substrate and arranged in intervals, each of the plurality of seat bodies includes at least one second positioning structure, and the at least one second positioning structure is configured to be connected to the first positioning structure of the at least one second hanging unit one of the first positioning structure and the second positioning structure includes two flanges and an engaging slot, the other of the first positioning structure and the second positioning structure includes a protrusion and two engaging grooves, the two flanges are arranged in interval and define the engaging slot, the two engaging grooves are located at opposing sides of the protrusion, the protrusion is inserted within the engaging slot in an insertion direction, and the two flanges are engaged within the two engaging grooves in the insertion direction so that the two flanges are lockable by the protrusion in a direction transverse to the insertion direction.

2. The tool hanger of claim 1, further including at least one first hanging unit, wherein the at least one first hanging unit includes an insertion portion and a first hanging member connected to each other, respective sides of neighboring two of the plurality of seat bodies facing each other each include a slot, and the insertion portion is positionably inserted the neighboring two of within the slot of the plurality of seat bodies in the insertion direction.

3. The tool hanger of claim 2, wherein the first hanging member includes a main rod and two supporting rods, the two supporting rods are connected to opposing ends of the main rod respectively, and the two supporting rods extend away from each other and are located correspondingly above the neighboring two of the plurality of seat bodies respectively.

4. The tool hanger of claim 2, wherein the base further includes at least one supporting block, the at least one supporting block is disposed between the neighboring two of the plurality of seat bodies, and when the insertion portion of the at least one first hanging unit is inserted in the slots of neighboring two of the plurality of seat bodies, the at least one supporting block is abutted against the insertion portion of the at least one first hanging unit in the insertion direction.

5. The tool hanger of claim 1, wherein the main body includes a first portion and a second portion, the first positioning structure and the second hanging member are disposed on the first portion, an end of the second portion is connected to the first portion, and another end of the second portion extends away from the first portion and away from the substrate.

6. The tool hanger of claim 1, wherein the base further includes a plurality of reinforcing ribs, and the plurality of reinforcing ribs are disposed adjacent to the first end portion and the second end portion.

7. The tool hanger of claim 1, wherein each of the plurality of elastic clip portions includes a first recess configured to increase flexibility of each of the plurality of elastic clip portions, and the clipped portion includes a second recess configured to increase flexibility of the clipped portion.

8. The tool hanger of claim 1, wherein the plurality of elastic clip portions are separate and protrusive from the base and define a dovetail slot, the clipped portion is protrusive from the base and is dovetailed, and the clipped portion is configured to be received in a dovetail slot of the another base.

9. The tool hanger of claim 5, further including at least one first hanging unit, wherein the at least one first hanging unit includes an insertion portion and a first hanging member connected to each other, respective sides of neighboring two of the plurality of seat bodies facing each other each include a slot, and the insertion portion is positionably inserted within the slot of the neighboring two of the plurality of seat bodies in the insertion direction; the first hanging member includes a main rod and two supporting rods, the two supporting rods are connected to opposing ends of the main rod respectively, and the two supporting rods extend away from each other and are located correspondingly above the neighboring two of the plurality of seat bodies respectively; the base further includes at least one supporting block, the at least one supporting block is disposed between the neighboring two of the plurality of seat bodies, and when the insertion portion of the at least one first hanging unit is inserted in the slot of the neighboring two of the plurality of seat bodies, the at least one supporting block is abutted against the insertion portion of the at least one first hanging unit in the insertion direction; the base further includes a plurality of reinforcing ribs, and the plurality of reinforcing ribs are disposed adjacent to the first end portion and the second end portion; each of the plurality of elastic clip portions includes a first recess configured to increase flexibility of each of the plurality of elastic clip portions, and the clipped portion includes a second recess configured to increase flexibility of the clipped portion; the plurality of elastic clip portions are separate and protrusive from the base and define a dovetail slot, the clipped portion is protrusive from the base and is dovetailed, and the clipped portion is configured to be received in a dovetail slot of the another base; the base is formed by plastic injection molding; the at least one second positioning structure includes two second positioning structures; the projection includes a receiving room; the projection and the concave portion are trapezoidal; the seat body is a rectangular block; the substrate is an elongated plate.

* * * * *